US012397828B2

United States Patent
Cui et al.

(10) Patent No.: US 12,397,828 B2
(45) Date of Patent: Aug. 26, 2025

(54) WEATHER-INFORMED PATH PLANNING FOR A VEHICLE

(71) Applicant: GM Global Technology Operations LLC, Detroit, MI (US)

(72) Inventors: Michael Cui, Winnetka, CA (US); Hyukseong Kwon, Thousand Oaks, CA (US); Rodolfo Valiente Romero, Calabasas, CA (US); Andrew Howe, Malibu, CA (US); Alexander Waagen, Malibu, CA (US); Alexei Kopylov, Malibu, CA (US); Marcus James Huber, Saline, MI (US); Alireza Esna Ashari Esfahani, Daly City, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 248 days.

(21) Appl. No.: 18/453,489

(22) Filed: Aug. 22, 2023

(65) Prior Publication Data
US 2025/0065917 A1 Feb. 27, 2025

(51) Int. Cl.
*B60W 60/00* (2020.01)
*B60W 30/09* (2012.01)
*B60W 30/095* (2012.01)

(52) U.S. Cl.
CPC ........ *B60W 60/0016* (2020.02); *B60W 30/09* (2013.01); *B60W 30/0956* (2013.01);
(Continued)

(58) Field of Classification Search
None
See application file for complete search history.

(56) References Cited

U.S. PATENT DOCUMENTS

| 6,445,308 B1 | 9/2002 | Koike | |
|---|---|---|---|
| 11,851,089 B1 * | 12/2023 | Hinojosa | ............... B60W 40/02 |

(Continued)

FOREIGN PATENT DOCUMENTS

| DE | 102004009515 A1 | 9/2004 |
|---|---|---|
| DE | 60016815 T2 | 1/2006 |

(Continued)

OTHER PUBLICATIONS

"Highway Capacity Manual, Chapter 22: Freeway Facilities", Jun. 1999, Transportation Research Board, Washington D.C., USA.
(Continued)

*Primary Examiner* — Hitesh Patel
*Assistant Examiner* — Wenyuan Yang
(74) *Attorney, Agent, or Firm* — Vivacqua Crane, PLLC

(57) ABSTRACT

According to several aspects, a method for path planning for a vehicle includes determining a predicted trajectory of a remote vehicle. The predicted trajectory of the remote vehicle includes a plurality of predicted trajectory nodes. The method further includes determining a plurality of possible trajectories for the vehicle. The plurality of possible trajectories includes a plurality of possible trajectory nodes. The method further includes determining one or more evaluation metrics of each of the plurality of possible trajectory nodes based at least in part on a weather condition in an environment surrounding the vehicle. The method further includes selecting an optimal trajectory for the vehicle from the plurality of possible trajectories based at least in part on the one or more evaluation metrics of each of the plurality of possible trajectory nodes. The method further includes performing a first action based at least in part on the optimal trajectory.

20 Claims, 7 Drawing Sheets

(52) U.S. Cl.
CPC .... *B60W 60/00182* (2020.02); *B60W 60/00272* (2020.02); *B60W 60/00274* (2020.02); *B60W 60/00276* (2020.02)

(56) References Cited

U.S. PATENT DOCUMENTS

| | | | |
|---|---|---|---|
| 2002/0067289 A1* | 6/2002 | Smith | G08G 1/0962 340/905 |
| 2021/0009163 A1* | 1/2021 | Urtasun | G08G 1/0133 |
| 2022/0153258 A1* | 5/2022 | Arechiga-Gonzalez | G08G 1/147 |
| 2022/0177001 A1 | 6/2022 | Kulkarni et al. | |

FOREIGN PATENT DOCUMENTS

| | | |
|---|---|---|
| DE | 102013016488 A1 | 4/2015 |
| DE | 102016003026 A1 | 9/2016 |
| DE | 102016211208 A1 | 12/2017 |
| DE | 102017112300 A1 | 12/2017 |
| DE | 102021206694 A1 | 12/2022 |
| DE | 102022124517 A1 | 7/2023 |

OTHER PUBLICATIONS

"How Do Weather Events Impact Roads: FHWA Road Weather Management Program", Federal Highway Administration, 2023, U.S. Department of Transportation, Washington D.C., USA.

"PTV VISSIM 11 Manual", 2022, PTV Planung Transport Verkehr AG, Karlsruhe, Germany.

Ahmed, M. et al., "Driver Performance and Behavior in Adverse Weather Conditions: An Investigation Using the SHRP2 Naturalistic Driving Study Data—Phase 2", SHRP2Solutions, Dec. 2015, U.S. Department of Transportation, USA.

Ahmed, M. et al., "Global lessons learned from naturalistic driving studies to advance traffic safety and operation research: A systematic review", Accident Analysis & Prevention, Mar. 2022, vol. 167, Elsevier, Amsterdam, Netherlands.

Ahmed, M. et al., "Implementation of SHRP2 Results within the Wyoming Connected Vehicle Variable Speed Limit System: Phase 2 Early Findings Report and Phase 3 Proposal", 2017, Department of Civil and Architectural Engineering, Laramie, WY, USA.

Andreescu, M., et al., "Weather and Traffic Accidents in Montreal", Canada, Climate Research, Feb. 27, 1998, vol. 9: 225-230, Inter-Research, Luhe, Germany.

Andrey, J. et al., "Relationships Between Weather and Road Safety: Past and Future Research Directions", Climatological Bulletin vol. 24, No. 3, 123-137, Jan. 5, 1990, Canadian Meteorological and Oceanographic Society, Ottawa, ON, CA.

Antin, J. et al, "Design of the In-Vehicle Driving Behavior and Crash Risk Study", Virginia Tech Transportation Institute, 2011, National Academy of Sciences, Washington D.C., USA.

Chen, C. et al., "Assessing the Influence of Adverse Weather on Traffic Flow Characteristics Using a Driving Simulator and VISSIM", "Sustainability", Dec. 12, 2018, Multidisciplinary Digital Publishing Institute (MDPI), Basel, Switzerland.

Ciuffo, B. et al., "Thirty Years of Gipps' Car-Following Model: Applications, Developments, and New Features", Transportation Research Record Journal of the Transportation Research Board 2315, Dec. 2012, 89-99, SAGE Journals, Thousand Oaks, CA, USA.

Das, A. et al., "Structural Equation Modeling Approach for Investigating Driver Behavior in Adverse Weather Conditions using Trajectory-level SHRP2 Naturalistic Driving Data", Road Safety & Simulation Internation Conference, University of Wyoming Department of Civil and Architectural Engineering, Laramie, WY, USA.

Gao, Y., "Calibration and Comparison of the VISSIM and INTEGRATION Microscopic Traffic Simulation Models", Virginia Tech Department of Civil and Environmental Engineering, Sep. 5, 2008, Virginia Tech, Blacksburg, VA, USA.

Ghasemzadeh, A. et al., "Utilizing naturalistic driving data for in-depth analysis of driver lane-keeping behavior in rain: Non-parametric MARS and parametric logistic regression modeling approaches", Transportation Research Part C: Emerging Technologies, 2018, 379-392, vol. 90, University of Wyoming, Laramie, WY, USA.

Ghasemzadeh, A., "Driver Speed and Lane Keeping Behaviors in Adverse Weather Conditions: An Investigation Using the Second Strategic Highway Research Program Naturalistic Driving Data", Department of Civil and Architectural Engineering, Dec. 2017, University of Wyoming, Laramie, WY, USA.

Gipps, P., "A Behavioural Car-Following Model for Computer Simulation", Transportation Research Part B: Methodological 15, No. 2 (1981), 105-111, Elsevier Ltd., Amsterdam, Netherlands.

Gipps, P., "A model for the structure of lane-changing decisions", Transportation Research Part B: Methodological, Oct. 1986, pp. 403-414, vol. 20, Issue 5, Elsevier, Amsterdam, Netherlands.

Hammit, B. et al., "Toward the Development of Weather-Dependent Microsimulation Models", Transportation Research Record, Apr. 28, 2019, pp. 143-156, vol. 2673, Issue 7, Transportation Research Board, Washington, D. C., US.

Hosseinlou, M. et al., "A study of the minimum safe stopping distance between vehicles in terms of braking systems, weather and pavement conditions", Indian Journal of Science and Technology, Oct. 2012, 3422-3427, vol. 5, Indian Journal of Science and Technology, India.

Khan, M. et al., "Development of a Novel Convolutional Neural Network Architecture Named RoadweatherNet for Trajectory-Level Weather Detection using SHRP2 Naturalistic Driving Data", Transportation Research Record, Apr. 2, 2021, pp. 1016-1030, vol. 2675, Issue 9, Transportation Research Board, Washington, D.C., US.

McCann, K. et al., "Investigation of Driver Speed Choice and Crash Characteristics During Low Visibility Events", Virginia Transporation Research Council, No. VTRC 17-R4. Virginia. Dept. of Transportation, 2016.

Pisano, P., et al., "Surface Transportation Weather Applications", Federal Highway Administration in concert with Mitretek Systems, 2002, Institute of Transportation Engineers, USA.

Shabarek, A. et al., "Deep Learning Framework for Freeway Speed Prediction in Adverse Weather", Transportation Research Record, Aug. 27, 2020, vol. 2674, Issue 10, Transportation Research Board, Washington, D.C., US.

Tanner, J.C., "Effect of Weather on Traffic Flow", Nature, Jan. 19, 1952, 107, vol. 169, Issue 4290, Nature Publishing Group, USA.

Winsor, M., "Influence of Connected and Cooperative Vehicles on Virtual Right of Way Performance in Mixed Traffic", Jun. 4, 2020, pp. 1-77, Technical University of Munich, Germany.

Baffet, G., et al. "An Observer of Tire-Road Forces and Friction for Active Security Vehicle Systems," IEEE/ASME Transactions on Mechatronics, vol. 12, No. 6, 2007, pp. 651-663.

U.S. Appl. No. 18/335,758, filed Jul. 3, 2023.
U.S. Appl. No. 18/340,249, filed Jun. 23, 2023.

\* cited by examiner

WEATHER-INFORMED PATH PLANNING FOR A VEHICLE

INTRODUCTION

The present disclosure relates to advanced driver assistance and automated driving systems and methods for vehicles, and more particularly, to systems and methods for path planning for a vehicle.

To increase occupant awareness and convenience, vehicles may be equipped with advanced driver assistance systems (ADAS) and/or automated driving systems (ADS). ADAS systems may use various sensors such as cameras, radar, and LiDAR (light detection and ranging) to detect and identify objects around the vehicle, including other vehicles, pedestrians, road configurations, traffic signs, and road markings. ADAS systems may take actions based on environmental conditions surrounding the vehicle, such as applying brakes or alerting an occupant of the vehicle. ADS systems may use various sensors to detect objects in the environment around the vehicle and control the vehicle to navigate the vehicle through the environment to a predetermined destination. However, current ADAS and ADS systems may not account for adverse weather conditions, which may lead to non-ideal path planning and/or remote vehicle trajectory predictions. Furthermore, current ADAS and ADS systems may not consider unconventional maneuvers which may be necessary to avoid a collision in adverse weather conditions.

Thus, while ADAS and ADS systems and methods achieve their intended purpose, there is a need for a new and improved system and method for path planning for a vehicle.

SUMMARY

According to several aspects, a method for path planning for a vehicle is provided. The method may include determining a predicted trajectory of a remote vehicle. The predicted trajectory of the remote vehicle includes a plurality of predicted trajectory nodes. The method further may include determining a plurality of possible trajectories for the vehicle. The plurality of possible trajectories includes a plurality of possible trajectory nodes. The method further may include determining one or more evaluation metrics of each of the plurality of possible trajectory nodes based at least in part on a weather condition in an environment surrounding the vehicle. The method further may include selecting an optimal trajectory for the vehicle from the plurality of possible trajectories based at least in part on the one or more evaluation metrics of each of the plurality of possible trajectory nodes. The method further may include performing a first action based at least in part on the optimal trajectory.

In another aspect of the present disclosure, the one or more evaluation metrics further includes a collision potential score. Determining the collision potential score for each of the plurality of possible trajectory nodes further may include determining a plurality of uncertainties. The plurality of uncertainties includes a plurality of predicted trajectory uncertainties and a plurality of possible trajectory uncertainties. Each of the plurality of predicted trajectory uncertainties corresponds to one of the plurality of predicted trajectory nodes. Each of the plurality of possible trajectory uncertainties corresponds to one of the plurality of possible trajectory nodes. Determining the collision potential score for each of the plurality of possible trajectory nodes further may include determining a plurality of biased predicted trajectory uncertainties and a plurality of biased possible trajectory uncertainties by applying a bias to each of the plurality of predicted trajectory uncertainties and each of the plurality of possible trajectory uncertainties. The bias is based at least in part on the weather condition in the environment surrounding the vehicle. Determining the collision potential score for each of the plurality of possible trajectory nodes further may include determining the collision potential score for each of the plurality of possible trajectory nodes based at least in part on the plurality of biased predicted trajectory uncertainties and the plurality of biased possible trajectory uncertainties.

In another aspect of the present disclosure, determining the plurality of uncertainties further may include determining the plurality of uncertainties based on at least one of: the weather condition in the environment surrounding the vehicle and a localization error of one or more of a plurality of vehicle sensors.

In another aspect of the present disclosure, determining the plurality of biased predicted trajectory uncertainties and the plurality of biased possible trajectory uncertainties further may include determining a longitudinal bias for each of the plurality of possible trajectory nodes and each of the plurality of predicted trajectory nodes. Determining the plurality of biased predicted trajectory uncertainties and the plurality of biased possible trajectory uncertainties further may include determining a lateral bias for each of the plurality of possible trajectory nodes and each of the plurality of predicted trajectory nodes. The lateral bias is determined based at least in part on a dynamics-based model and the weather condition in the environment surrounding the vehicle. Determining the plurality of biased predicted trajectory uncertainties and the plurality of biased possible trajectory uncertainties further may include applying the longitudinal bias and the lateral bias to each of the plurality of predicted trajectory uncertainties. Determining the plurality of biased predicted trajectory uncertainties and the plurality of biased possible trajectory uncertainties further may include applying the longitudinal bias and the lateral bias to each of the plurality of possible trajectory uncertainties.

In another aspect of the present disclosure, determining the collision potential score for each of the plurality of possible trajectory nodes further may include determining the collision potential score using a formula:

$$p_i = \frac{r_i \cap e_i}{r_i \cup e_i}$$

where $p_i$ is the collision potential score for an ith node of the plurality of possible trajectory nodes, $r_i$ is one of the plurality of biased predicted trajectory uncertainties corresponding to an ith node of the plurality of predicted trajectory nodes, $e_i$ is one of the plurality of biased possible trajectory uncertainties corresponding to the ith node of the plurality of possible trajectory nodes, $\cap$ is an intersection operator, and $\cup$ is a union operator.

In another aspect of the present disclosure, the one or more evaluation metrics further includes a maneuverability score. Determining the maneuverability score for each of the plurality of possible trajectory nodes further may include determining an estimated propulsion system torque required to reach each of the plurality of possible trajectory nodes. Determining the maneuverability score for each of the plurality of possible trajectory nodes further may include determining the maneuverability score for each of the plurality of possible trajectory nodes based at least in part on the estimated propulsion system torque using a formula:

$$m_i = \frac{T_i}{T_{MAX}}$$

where $m_i$ is the maneuverability score for an ith node of the plurality of possible trajectory nodes, $T_i$ is the estimated propulsion system torque required to reach the ith node of the plurality of possible trajectory nodes, and $T_{MAX}$ is a maximum torque available from a propulsion system of the vehicle.

In another aspect of the present disclosure, the one or more evaluation metrics further includes a traffic violation score. The traffic violation score quantifies a legality of maneuvering the vehicle to each of the plurality of possible trajectory nodes.

In another aspect of the present disclosure, selecting the optimal trajectory further may include selecting a subset of the plurality of possible trajectory nodes to be the optimal trajectory. The subset of the plurality of possible trajectory nodes is selected to minimize a sum of each of the one or more evaluation metrics of each of the subset of the plurality of possible trajectory nodes.

In another aspect of the present disclosure, selecting the optimal trajectory further may include selecting a subset of the plurality of possible trajectory nodes to be the optimal trajectory. The subset of the plurality of possible trajectory nodes is selected to minimize an objective function:

$$c = \sum_{i=0}^{N} \frac{N-i}{N} * (p_i + v_i + m_i)$$

where c is the objective function, N is a quantity of nodes in the subset of the plurality of possible trajectory nodes, $p_i$ is the collision potential score of an ith node of the subset of the plurality of possible trajectory nodes, $v_i$ is the traffic violation score of the ith node of the subset of the plurality of possible trajectory nodes, and $m_i$ is the maneuverability score of the ith node of the subset of the plurality of possible trajectory nodes. Each of the subset of the plurality of possible trajectory nodes is from a same one of the plurality of possible trajectories. A first node of the subset of the plurality of possible trajectory nodes and a second node of the subset of the plurality of possible trajectory nodes have a collision potential score of less than one.

In another aspect of the present disclosure, performing the first action further may include adjusting an operation of an automated driving system of the vehicle based at least in part on the optimal trajectory.

According to several aspects, a system for path planning for a vehicle is provided. The system may include a plurality of vehicle sensors, an automated driving system, and a controller in electrical communication with the plurality of vehicle sensors and the automated driving system. The controller is programmed to determine a predicted trajectory of a remote vehicle using the plurality of vehicle sensors. The predicted trajectory of the remote vehicle includes a plurality of predicted trajectory nodes. The controller is further programmed to determine a plurality of possible trajectories for the vehicle using the plurality of vehicle sensors. The plurality of possible trajectories includes a plurality of possible trajectory nodes. The controller is further programmed to determine one or more evaluation metrics of each of the plurality of possible trajectory nodes based at least in part on a weather condition in an environment surrounding the vehicle. The weather condition is determined using the plurality of vehicle sensors. The controller is further programmed to select an optimal trajectory for the vehicle from the plurality of possible trajectories based at least in part on the one or more evaluation metrics of each of the plurality of possible trajectory nodes. The controller is further programmed to adjust an operation of the automated driving system based at least in part on the optimal trajectory.

In another aspect of the present disclosure, the one or more evaluation metrics further includes a collision potential score. To determine the collision potential score for each of the plurality of possible trajectory nodes, the controller is further programmed to determine a plurality of uncertainties. The plurality of uncertainties includes a plurality of predicted trajectory uncertainties and a plurality of possible trajectory uncertainties. Each of the plurality of predicted trajectory uncertainties corresponds to one of the plurality of predicted trajectory nodes. Each of the plurality of possible trajectory uncertainties corresponds to one of the plurality of possible trajectory nodes. To determine the collision potential score for each of the plurality of possible trajectory nodes, the controller is further programmed to determine a plurality of biased predicted trajectory uncertainties and a plurality of biased possible trajectory uncertainties by applying a bias to each of the plurality of predicted trajectory uncertainties and each of the plurality of possible trajectory uncertainties. The bias is based at least in part on the weather condition in the environment surrounding the vehicle. To determine the collision potential score for each of the plurality of possible trajectory nodes, the controller is further programmed to determine the collision potential score for each of the plurality of possible trajectory nodes based at least in part on the plurality of biased predicted trajectory uncertainties and the plurality of biased possible trajectory uncertainties.

In another aspect of the present disclosure, to determine the plurality of biased predicted trajectory uncertainties and the plurality of biased possible trajectory uncertainties, the controller is further programmed to determine a longitudinal bias for each of the plurality of possible trajectory nodes and each of the plurality of predicted trajectory nodes. To determine the plurality of biased predicted trajectory uncertainties and the plurality of biased possible trajectory uncertainties, the controller is further programmed to determine a lateral bias for each of the plurality of possible trajectory nodes and each of the plurality of predicted trajectory nodes. The lateral bias is determined based at least in part on a dynamics-based model and the weather condition in the environment surrounding the vehicle. To determine the plurality of biased predicted trajectory uncertainties and the plurality of biased possible trajectory uncertainties, the controller is further programmed to apply the longitudinal bias and the lateral bias to each of the plurality of predicted trajectory uncertainties. To determine the plurality of biased predicted trajectory uncertainties and the plurality of biased possible trajectory uncertainties, the controller is further programmed to apply the longitudinal bias and the lateral bias to each of the plurality of possible trajectory uncertainties.

In another aspect of the present disclosure, to determine the collision potential score for each of the plurality of possible trajectory nodes, the controller is further programmed to determine the collision potential score using a formula:

$$p_i = \frac{r_i \cap e_i}{r_i \cup e_i}$$

where $p_i$ is the collision potential score for an ith node of the plurality of possible trajectory nodes, $r_i$ is one of the plurality of biased predicted trajectory uncertainties corresponding to an ith node of the plurality of predicted trajectory nodes, $e_i$ is one of the plurality of biased possible trajectory uncertainties corresponding to the ith node of the plurality of possible trajectory nodes, $\cap$ is an intersection operator, and $\cup$ is a union operator.

In another aspect of the present disclosure, the one or more evaluation metrics further includes a maneuverability score. To determine the maneuverability score for each of the plurality of possible trajectory nodes, the controller is further programmed to determine an estimated propulsion system torque required to reach each of the plurality of possible trajectory nodes. To determine the maneuverability score for each of the plurality of possible trajectory nodes, the controller is further programmed to determine the maneuverability score for each of the plurality of possible trajectory nodes based at least in part on the estimated propulsion system torque using a formula:

$$m_i = \frac{T_i}{T_{MAX}}$$

where $m_i$ is the maneuverability score for an ith node of the plurality of possible trajectory nodes, $T_i$ is the estimated propulsion system torque required to reach the ith node of the plurality of possible trajectory nodes, and $T_{MAX}$ is a maximum torque available from a propulsion system of the vehicle.

In another aspect of the present disclosure, the one or more evaluation metrics further includes a traffic violation score. The traffic violation score quantifies a legality of maneuvering the vehicle to each of the plurality of possible trajectory nodes.

In another aspect of the present disclosure, to select the optimal trajectory, the controller is further programmed to select a subset of the plurality of possible trajectory nodes to be the optimal trajectory. The subset of the plurality of possible trajectory nodes is selected to minimize an objective function:

$$c = \sum_{i=0}^{N} \frac{N-i}{N} * (p_i + v_i + m_i)$$

where c is the objective function, N is a quantity of nodes in the subset of the plurality of possible trajectory nodes, $p_i$ is the collision potential score of an ith node of the subset of the plurality of possible trajectory nodes, $v_i$ is the traffic violation score of the ith node of the subset of the plurality of possible trajectory nodes, and $m_i$ is the maneuverability score of the ith node of the subset of the plurality of possible trajectory nodes. Each of the subset of the plurality of possible trajectory nodes is from a same one of the plurality of possible trajectories. A first node of the subset of the plurality of possible trajectory nodes and a second node of the subset of the plurality of possible trajectory nodes have a collision potential score of less than one.

According to several aspects, a system for path planning for a vehicle is provided. The system may include a plurality of vehicle sensors, an automated driving system, and a controller in electrical communication with the plurality of vehicle sensors and the automated driving system. The controller is programmed to determine a predicted trajectory of a remote vehicle using the plurality of vehicle sensors. The predicted trajectory of the remote vehicle includes a plurality of predicted trajectory nodes. The controller is further programmed to determine a plurality of possible trajectories for the vehicle using the plurality of vehicle sensors. The plurality of possible trajectories includes a plurality of possible trajectory nodes. The controller is further programmed to perform a closeness check of the plurality of possible trajectories. The closeness check includes removing a first trajectory from the plurality of possible trajectories in response to determining that the first trajectory includes one or more of the plurality of possible trajectory nodes which are within a predetermined minimum stopping distance of one or more of the plurality of predicted trajectory nodes. The controller is further programmed to determine one or more evaluation metrics of each of the plurality of possible trajectory nodes based at least in part on a weather condition in an environment surrounding the vehicle. The one or more evaluation metrics includes a collision potential score, a maneuverability score, and a traffic violation score. The controller is further programmed to select an optimal trajectory for the vehicle from the plurality of possible trajectories based at least in part on the one or more evaluation metrics of each of the plurality of possible trajectory nodes. The controller is further programmed to adjust an operation of the automated driving system. The operation of the automated driving system is adjusted such that the vehicle exits a lane boundary based at least in part on the optimal trajectory.

In another aspect of the present disclosure, to determine the collision potential score for each of the plurality of possible trajectory nodes, the controller is further programmed to determine a plurality of uncertainties. The plurality of uncertainties includes a plurality of predicted trajectory uncertainties and a plurality of possible trajectory uncertainties. Each of the plurality of predicted trajectory uncertainties corresponds to one of the plurality of predicted trajectory nodes. Each of the plurality of possible trajectory uncertainties corresponds to one of the plurality of possible trajectory nodes. To determine the collision potential score for each of the plurality of possible trajectory nodes, the controller is further programmed to determine a plurality of biased predicted trajectory uncertainties and a plurality of biased possible trajectory uncertainties by applying a bias to each of the plurality of predicted trajectory uncertainties and each of the plurality of possible trajectory uncertainties. The bias is based at least in part on the weather condition in the environment surrounding the vehicle. To determine the collision potential score for each of the plurality of possible trajectory nodes, the controller is further programmed to determine the collision potential score for each of the plurality of possible trajectory nodes based at least in part on the plurality of biased predicted trajectory uncertainties and a plurality of biased possible trajectory uncertainties.

In another aspect of the present disclosure, to select the optimal trajectory, the controller is further programmed to select a subset of the plurality of possible trajectory nodes to be the optimal trajectory. The subset of the plurality of possible trajectory nodes is selected to minimize an objective function:

$$c = \sum_{i=0}^{N} \frac{N-i}{N} * (p_i + v_i + m_i)$$

where c is the objective function, N is a quantity of nodes in the subset of the plurality of possible trajectory nodes, $p_i$ is the collision potential score of an ith node of the subset of the plurality of possible trajectory nodes, $v_i$ is the traffic violation score of the ith node of the subset of the plurality of possible trajectory nodes, and $m_i$ is the maneuverability score of the ith node of the subset of the plurality of possible trajectory nodes. Each of the subset of the plurality of possible trajectory nodes is from a same one of the plurality of possible trajectories. A first node of the subset of the plurality of possible trajectory nodes and a second node of the subset of the plurality of possible trajectory nodes have a collision potential score of less than one.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Adverse weather conditions, such as, for example, extreme high or low temperatures, precipitation, and/or the like may lead to adverse road surface conditions, such as, for example, wet, icy, and/or snow-covered road surface conditions. Vehicle dynamics may be influenced by the aforementioned weather and/or road surface conditions, resulting in altered handling characteristics, driving characteristics, vehicle performance, and/or the like. Additionally, adverse weather and/or road surface conditions may present scenarios requiring evasive or otherwise unconventional action in order to avoid a collision. Therefore, the present disclosure provides a new and improved system and method for path planning for a vehicle which considers effects of weather and road surface conditions on vehicle dynamics and contemplates the use of unconventional actions to avoid collisions in extreme weather conditions.

Figure 1:
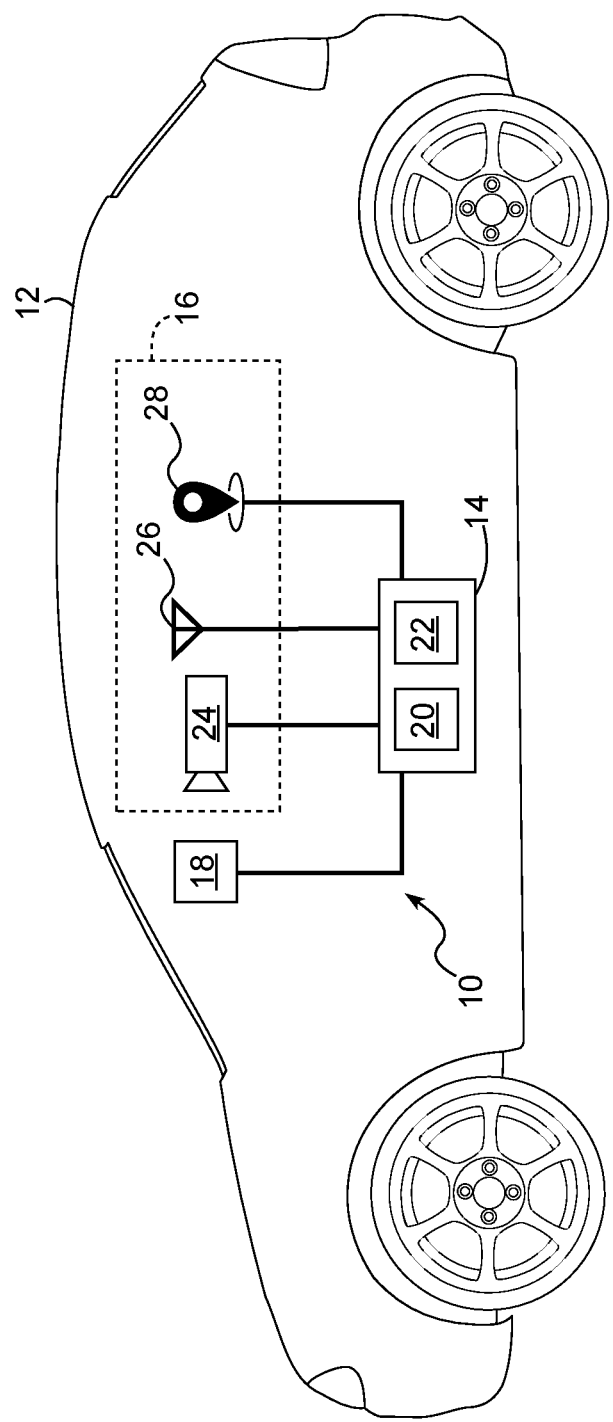
FIG. 1 is a schematic diagram of a system for path planning for a vehicle, according to an exemplary embodiment.

Referring to FIG. 1, a system for path planning for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a plurality of vehicle sensors 16, and an automated driving system 18.

The controller 14 is used to implement a method 100 for path planning for a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16 and the automated driving system 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of vehicle sensors 16 are used to acquire information relevant to the vehicle 12. In an exemplary embodiment, the plurality of vehicle sensors 16 includes a camera system 24, a vehicle communication system 26, and a global navigation satellite system (GNSS) 28.

In another exemplary embodiment, the plurality of vehicle sensors 16 further includes sensors to determine performance data about the vehicle 12. In a non-limiting example, the plurality of vehicle sensors 16 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 16 further includes sensors to determine information about an environment within the vehicle 12. In a non-limiting example, the plurality of vehicle sensors 16 further includes at least one of a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about the environment surrounding the vehicle 12. In a non-limiting example, the plurality of vehicle sensors 16 further includes at least one of an ambient air temperature sensor, a barometric pressure sensor, and/or a photo and/or video camera which is positioned to view the environment in front of the vehicle 12.

In another exemplary embodiment, at least one of the plurality of vehicle sensors 16 is a perception sensor capable of perceiving objects and/or measuring distances in the environment surrounding the vehicle 12. In a non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen of the vehicle 12. In another example, at least one of the plurality of vehicle sensors 16 is affixed outside of the vehicle 12, for example, on a roof of the vehicle 12, having a view of the environment surrounding the vehicle 12. It should be understood that various additional types of perception sensors, such as, for example, LiDAR sensors, ultrasonic ranging sensors, radar sensors, and/or time-of-flight sensors are within the scope of the present disclosure. The plurality of vehicle sensors 16 are in electrical communication with the controller 14 as discussed above.

The camera system 24 is a perception sensor used to capture images and/or videos of the environment surrounding the vehicle 12. In an exemplary embodiment, the camera system 24 includes a photo and/or video camera which is positioned to view the environment surrounding the vehicle 12. In a non-limiting example, the camera system 24 includes a camera affixed inside of the vehicle 12, for example, in a headliner of the vehicle 12, having a view through a windscreen. In another non-limiting example, the camera system 24 includes a camera affixed outside of the vehicle 12, for example, on a roof of the vehicle 12, having a view of the environment in front of the vehicle 12.

In another exemplary embodiment, the camera system 24 is a surround view camera system including a plurality of cameras (also known as satellite cameras) arranged to provide a view of the environment adjacent to all sides of the vehicle 12. In a non-limiting example, the camera system 24 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 24 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle communication system 26 is used by the controller 14 to communicate with other systems external to the vehicle 12. For example, the vehicle communication system 26 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 26 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 26 may further include an embedded universal integrated circuit card (eUICC) configured to store at least one cellular connectivity configuration profile, for example, an embedded subscriber identity module (eSIM) profile. The vehicle communication system 26 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 26 may include one or more antennas and/or communication transceivers for receiving and/or transmitting signals, such as cooperative sensing messages (CSMs). The vehicle communication system 26 is configured to wirelessly communicate information between the vehicle 12 and another vehicle. Further, the vehicle communication system 26 is configured to wirelessly communicate information between the vehicle 12 and infrastructure or other vehicles. It should be understood that the vehicle communication system 26 may be integrated with the controller 14 (e.g., on a same circuit board with the controller 14 or otherwise a part of the controller 14) without departing from the scope of the present disclosure.

The GNSS 28 is used to determine a geographical location of the vehicle 12. In an exemplary embodiment, the GNSS 28 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 28 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 28. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 28 may be integrated with the controller 14 (e.g., on a same circuit board with the controller 14 or otherwise a part of the controller 14) without departing from the scope of the present disclosure.

The automated driving system 18 is used to provide assistance to the occupant to increase occupant awareness and/or control behavior of the vehicle 12. In the scope of the present disclosure, the automated driving system 18 encompasses systems which provide any level of assistance to the occupant (e.g., blind spot warning, lane departure warning, and/or the like) and systems which are capable of autonomously driving the vehicle 12 under some or all conditions (e.g., automated lane keeping, adaptive cruise control, fully autonomous driving, and/or the like). It should be understood that all levels of driving automation defined by, for example, SAE J3016 (i.e., SAE LEVEL 0, SAE LEVEL 1, SAE LEVEL 2, SAE LEVEL 3, SAE LEVEL 4, and SAE LEVEL 5) are within the scope of the present disclosure.

In an exemplary embodiment, the automated driving system 18 is configured to detect and/or receive information about the environment surrounding the vehicle 12 and process the information to provide assistance to the occupant. In some embodiments, the automated driving system 18 is a software module executed on the controller 14. In other embodiments, the automated driving system 18 includes a separate automated driving system controller, similar to the controller 14, capable of processing the information about the environment surrounding the vehicle 12. In an exemplary embodiment, the automated driving system 18 may operate in a manual operation mode, a partially automated operation mode, and a fully automated operation mode.

In the scope of the present disclosure, the manual operation mode means that the automated driving system 18 provides warnings or notifications to the occupant but does not intervene or control the vehicle 12 directly. In a non-limiting example, the automated driving system 18 receives information from the plurality of vehicle sensors 16. Using techniques such as, for example, computer vision, the automated driving system 18 understands the environment surrounding the vehicle 12 and provides assistance to the occupant. For example, if the automated driving system 18 identifies, based on data from the plurality of vehicle sensors 16, that the vehicle 12 is likely to collide with a remote vehicle, the automated driving system 18 may use a display to provide a warning to the occupant.

In the scope of the present disclosure, the partially automated operation mode means that the automated driving system 18 provides warnings or notifications to the occupant and may intervene or control the vehicle 12 directly in certain situations. In a non-limiting example, the automated driving system 18 is additionally in electrical communication with components of the vehicle 12 such as a brake system, a propulsion system, and/or a steering system of the vehicle 12, such that the automated driving system 18 may control the behavior of the vehicle 12. In a non-limiting example, the automated driving system 18 may control the behavior of the vehicle 12 by applying brakes of the vehicle 12 to avoid an imminent collision. In another non-limiting example, the automated driving system 18 may control the steering system of the vehicle 12 to provide an automated lane keeping feature. In another non-limiting example, the automated driving system 18 may control the brake system, propulsion system, and steering system of the vehicle 12 to temporarily drive the vehicle 12 towards a predetermined destination. However, intervention by the occupant may be required at any time. In an exemplary embodiment, the automated driving system 18 may include additional components such as, for example, an eye tracking device configured to monitor an attention level of the occupant and ensure that the occupant is prepared to take over control of the vehicle 12.

In the scope of the present disclosure, the fully automated operation mode means that the automated driving system 18 uses data from the plurality of vehicle sensors 16 to understand the environment and control the vehicle 12 to drive the vehicle 12 to a predetermined destination without a need for control or intervention by the occupant.

The automated driving system 18 operates using a path planning algorithm which is configured to generate a safe and efficient trajectory for the vehicle 12 to navigate in the environment surrounding the vehicle 12. In an exemplary embodiment, the path planning algorithm is a machine learning algorithm trained to output control signals for the vehicle 12 based on input data collected from the plurality of vehicle sensors 16. In another exemplary embodiment, the path planning algorithm is a deterministic algorithm which has been programmed to output control signals for the vehicle 12 based on data collected from the plurality of vehicle sensors 16.

In a non-limiting example, the path planning algorithm generates a sequence of waypoints or a continuous path that the vehicle 12 should follow to reach a destination while adhering to rules, regulations, and safety constraints. The sequence of waypoints or continuous path is generated based at least in part on a detailed map and a current state of the vehicle 12 (i.e., position, velocity, and orientation of the vehicle 12). The detailed map includes, for example, information about lane boundaries, road geometry, speed limits, traffic signs, and/or other relevant features. In an exemplary embodiment, the detailed map is stored in the media 22 of the controller 14 and/or on a remote database or server. In another exemplary embodiment, the path planning algorithm performs perception and mapping tasks to interpret data collected from the plurality of vehicle sensors 16 and create, update, and/or augment the detailed map. In some examples, the path planning algorithm may be configured to generate multiple possible trajectories. An optimal trajectory is subsequently selected for use by the automated driving system 18, as will be discussed in greater detail below.

It should be understood that the automated driving system 18 may include any software and/or hardware module configured to operate in the manual operation mode, the partially automated operation mode, or the fully automated operation mode as described above.

Figure 2:
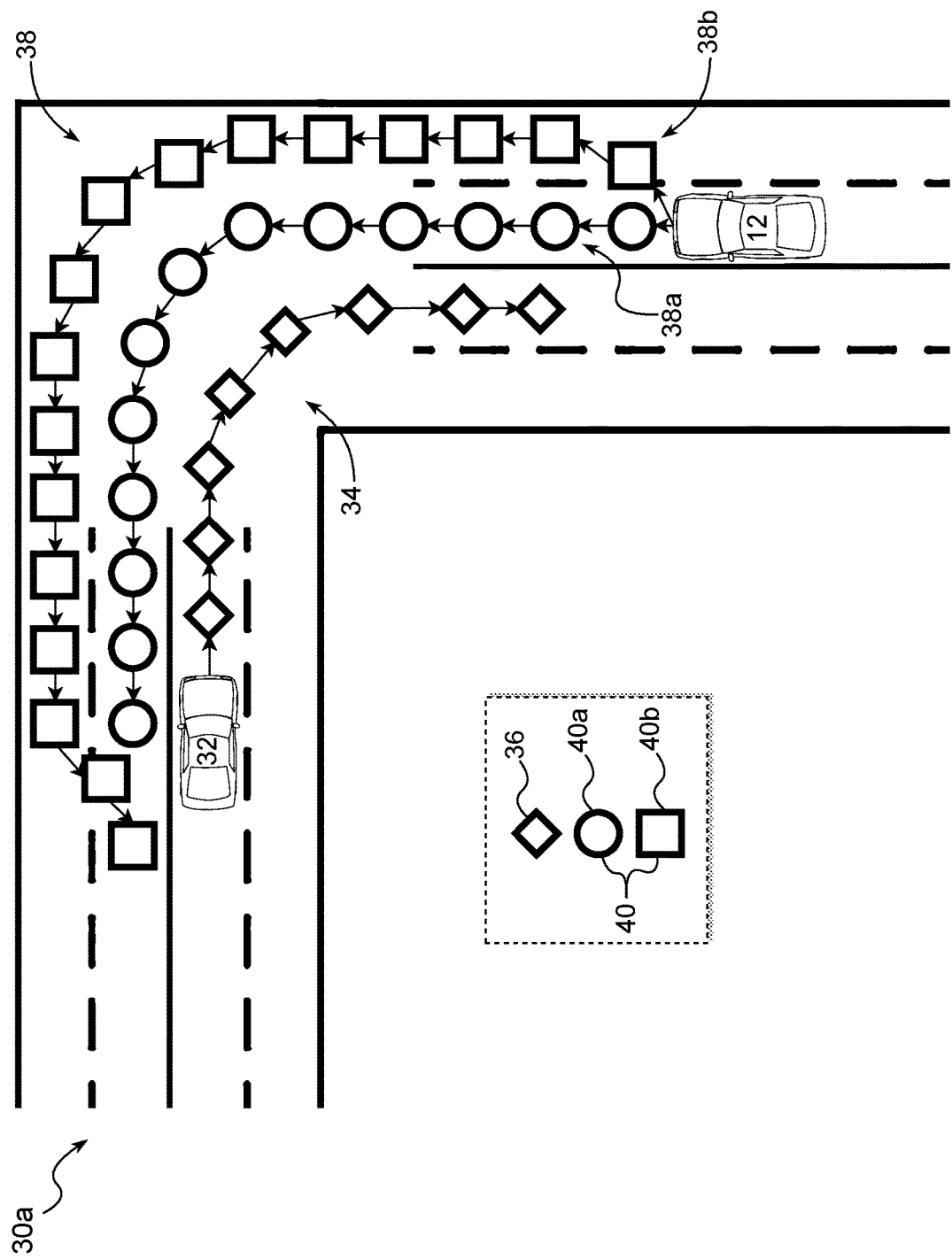
FIG. 2 is a schematic diagram of a first exemplary road scene, according to an exemplary embodiment.

Referring to FIG. 2, a schematic diagram of a first exemplary road scene 30*a* is shown. The first exemplary road scene 30*a* includes the vehicle 12 and a remote vehicle 32. The first exemplary road scene 30*a* further includes a predicted trajectory 34 of the remote vehicle 32. In the scope of the present disclosure, the predicted trajectory 34 describes a predicted path of the remote vehicle 32, as will be discussed in greater detail below. The predicted trajectory 34 includes a plurality of predicted trajectory nodes 36. In an exemplary embodiment, the plurality of predicted trajectory nodes 36 describe points along the predicted trajectory 34 and are located based on a predicted velocity of the remote vehicle 32. In a non-limiting example, the plurality of predicted trajectory nodes 36 are located such that a time required to travel between any two adjacent predicted trajectory nodes 36 is equal to a predetermined node spacing time (e.g., one second), based on the predicted velocity of the remote vehicle 32. While the first exemplary road scene 30a includes a single remote vehicle 32, it should be understood that the system 10 and method 100 of the present disclosure are also applicable to situations involving multiple remote vehicles.

The first exemplary road scene 30a further includes a plurality of possible trajectories 38 for the vehicle 12. In the scope of the present disclosure, the plurality of possible trajectories 38 includes at least two possible paths which may be taken by the vehicle 12, as will be discussed in greater detail below. The plurality of possible trajectories 38 includes a plurality of possible trajectory nodes 40. In an exemplary embodiment, the plurality of possible trajectory nodes 40 describe points along the plurality of possible trajectories 38 and are located based on a velocity of the vehicle 12. In a non-limiting example, the plurality of possible trajectory nodes 40 are located such that a time required to travel between any two adjacent possible trajectory nodes 40 is equal to a predetermined node spacing time (e.g., one second), based on the velocity of the vehicle 12. A first subset 40a of the plurality of possible trajectory nodes 40 is from a first possible trajectory 38a of the plurality of possible trajectories 38. A second subset 40b of the plurality of possible trajectory nodes 40 is from a second possible trajectory 38b of the plurality of possible trajectories 38. In the first exemplary road scene 30a, the plurality of possible trajectories 38 includes two possible trajectories 38 (i.e., the first possible trajectory 38a and the second possible trajectory 38b). However, it should be understood that the plurality of possible trajectories 38 may include more than two possible trajectories without departing from the scope of the present disclosure.

Figure 3:
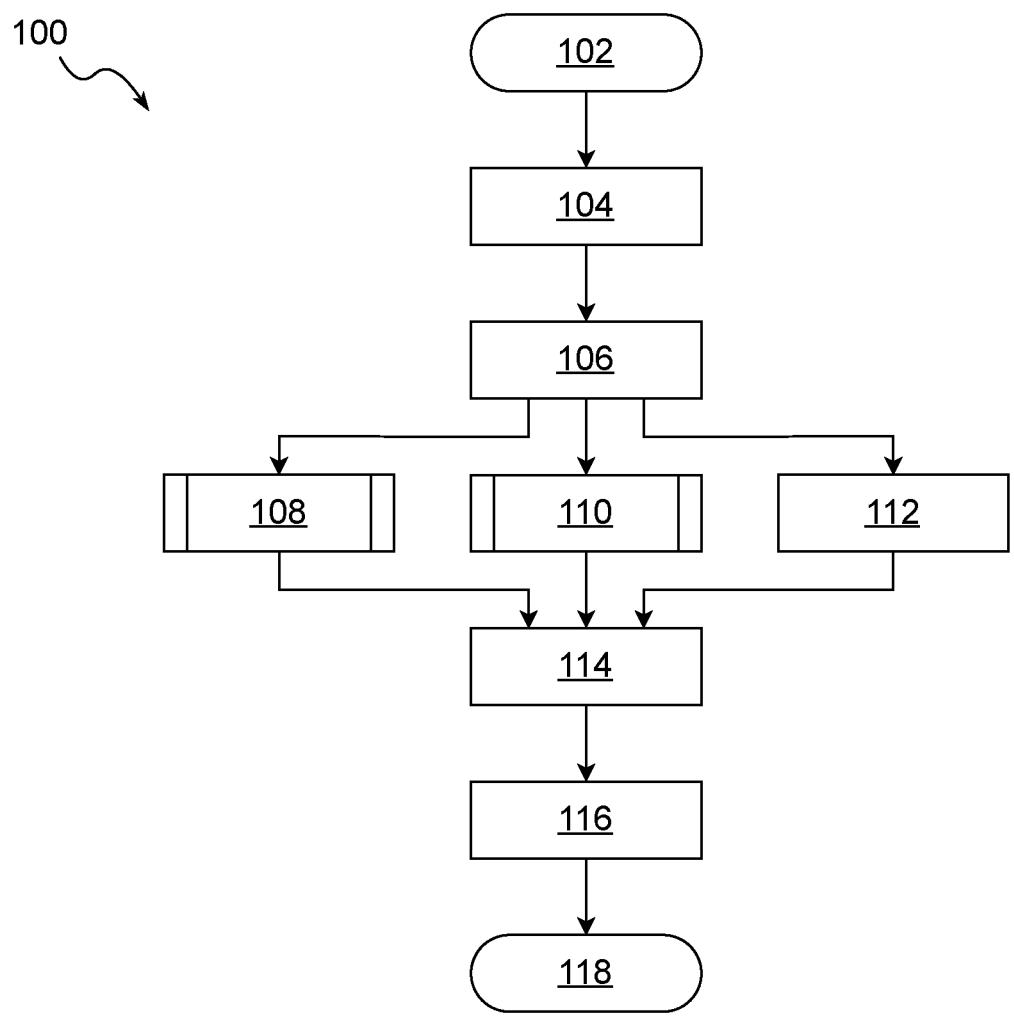
FIG. 3 is a flowchart of a method for path planning for a vehicle, according to an exemplary embodiment.

Referring to FIG. 3, a flowchart of the method 100 for path planning for a vehicle is shown. With reference to FIG. 3 and with continued reference to FIG. 2, the method 100 begins at block 102 and proceeds to block 104. At block 104, the controller 14 determines the predicted trajectory 34 of the remote vehicle 32. In an exemplary embodiment, to determine the predicted trajectory 34, the controller 14 uses the plurality of vehicle sensors 16 to receive information about the remote vehicle 32. In a non-limiting example, the information includes one or more measurements of the remote vehicle 32, for example, a position of the remote vehicle 32, a velocity of the remote vehicle 32, a heading of the remote vehicle 32, and/or the like.

In another exemplary embodiment, the controller 14 uses the vehicle communication system 26 to receive information about the remote vehicle 32. In a non-limiting example, the controller 14 uses the vehicle communication system 26 to receive a V2V (vehicle-to-vehicle) communication from the remote vehicle 32. The V2V communication may include information such as, for example, a position of the remote vehicle 32, a velocity of the remote vehicle 32, a heading of the remote vehicle 32, an intended path of the remote vehicle 32, and/or the like. In another non-limiting example, the controller 14 uses the vehicle communication system 26 to receive a V2I (vehicle-to-infrastructure) communication from infrastructure (e.g., a traffic control device, a traffic camera, and/or the like) including information about the remote vehicle 32.

The controller 14 then uses a path prediction algorithm to determine the predicted trajectory 34 based at least in part on the information about the remote vehicle 32. In a non-limiting example, the path prediction algorithm is a deterministic algorithm which uses a set of rules to determine the predicted trajectory 34 based on the information about the remote vehicle 32. In another non-limiting example, the path prediction algorithm is a machine learning algorithm, such as, for example, a convolutional neural network (CNN), a reinforcement learning algorithm, and/or the like. After block 104, the method 100 proceeds to block 106.

At block 106, the controller 14 determines the plurality of possible trajectories 38 for the vehicle 12. In an exemplary embodiment, to determine the plurality of possible trajectories 38, the controller 14 uses the plurality of vehicle sensors 16 to receive information about an environment surrounding the vehicle 12. The controller 14 then uses the path planning algorithm of the automated driving system 18 to generate the plurality of possible trajectories 38 based on the information about the environment surrounding the vehicle 12.

In an exemplary embodiment, a closeness check of the plurality of possible trajectories 38 is performed. The closeness check includes removing trajectories from the plurality of possible trajectories 38 which are too close to the predicted trajectory 34. In a non-limiting example, if a given node (e.g., a first node) of the plurality of possible trajectory nodes 40 is within a predetermined distance to any node (e.g., a first node) of the plurality of predicted trajectory nodes 36, the one of plurality of possible trajectories 38 including the given node is determined to be too close and is removed from the plurality of possible trajectories 38. In a non-limiting example, the predetermined distance is a predetermined minimum stopping distance required for the vehicle 12 to come to a full stop based at least in part on weather and/or road surface conditions.

In an exemplary embodiment, the predetermined minimum stopping distance required for the vehicle 12 to come to a full stop is calculated using a formula:

$$D_P = d_{BR} + d_B = 0.278Vt + \frac{V^2}{254\mu} \quad (1)$$

wherein $D_P$ is the predetermined minimum stopping distance, $d_{BR}$ is a braking reaction distance (i.e., a distance traveled by the vehicle 12 before the brakes are applied), $d_B$ is a braking distance (i.e., a distance traveled by the vehicle 12 while the brakes are being applied), V is a longitudinal velocity of the vehicle 12, t is a brake reaction time, and µ is a coefficient of friction of the road surface. The coefficient of friction of the road surface is based at least in part on weather and/or road surface conditions.

It is contemplated that, in some examples, trajectories including traffic violations, for example, trajectories requiring the vehicle 12 to exit a lane boundary, may be optimal when alternative trajectories involve a high risk of collision. Therefore, trajectories involving traffic violations but which are not too close to the predicted trajectory 34 are not removed from the plurality of possible trajectories 38 during the closeness check.

After block 106, the method 100 proceeds to blocks 108, 110, and 112 to determine one or more evaluation metrics of each of the plurality of possible trajectory nodes 40. In an exemplary embodiment, the one or more evaluation metrics include a collision potential score, a maneuverability score, and a traffic violation score. In the scope of the present disclosure, the one or more evaluation metrics are metrics used to quantify an optimality of each of the plurality of possible trajectories 38.

At block 108, the controller 14 determines the collision potential score of each of the plurality of possible trajectory nodes 40, as will be discussed in greater detail below. After block 108, the method 100 proceeds to block 114, as will be discussed in greater detail below.

At block 110, the controller 14 determines the maneuverability score of each of the plurality of possible trajectory nodes 40, as will be discussed in greater detail below. After block 110, the method 100 proceeds to block 114, as will be discussed in greater detail below.

At block 112, the controller 14 determines the traffic violation score of each of the plurality of possible trajectory nodes 40. In the scope of the present disclosure, the traffic violation score quantifies a legality of maneuvering the vehicle 12 to each of the plurality of possible trajectory nodes 40. In a non-limiting example, a higher traffic violation score indicates that maneuvering the vehicle 12 to a given one of the plurality of possible trajectory nodes is more illegal. In an exemplary embodiment, to determine the traffic violation score, the controller 14 evaluates a location of each of the plurality of possible trajectory nodes 40 against known road geometry (e.g., from the detailed map used by the path planning algorithm of the automated driving system 18 and/or the map included in the GNSS 28).

In a non-limiting example, if a first given node of the plurality of possible trajectory nodes 40 is located in an oncoming traffic lane (i.e., requires the vehicle 12 to drive the wrong direction on a one-way lane of travel), the traffic violation score of the first given node is determined to be one (1). If a second given node of the plurality of possible trajectory nodes 40 is located in a non-road area (i.e., requires the vehicle 12 to leave the roadway and travel on a shoulder, median, sidewalk, and/or the like), the traffic violation score of the second given node is determined to be one-half (0.5). If a third given node of the plurality of possible trajectory nodes 40 is not located in a non-road area and is not located in an oncoming traffic lane, the traffic violation score of the third given node is determined to be zero (0).

It should be understood that the above scenarios and traffic violation scores are merely exemplary in nature. The traffic violation score may be a continuous value without departing from the scope of the present disclosure. The traffic violation score may be determined using additional methods, including, for example, a machine learning algorithm trained to determine traffic violation scores, a rule-based algorithm configured to determine traffic violation scores based on a known set of traffic rules, and/or the like without departing from the scope of the present disclosure. Furthermore, it is contemplated that, in some examples, trajectories including traffic violations, for example, trajectories requiring the vehicle 12 to exit a lane boundary, may be optimal when alternative trajectories involve a high risk of collision. After block 112, the method 100 proceeds to block 114.

At block 114, the controller 14 selects an optimal trajectory based at least in part on the one or more evaluation metrics (i.e., the collision potential score, the maneuverability score, and the traffic violation score). In an exemplary embodiment, the optimal trajectory is a subset of the plurality of possible trajectory nodes 40 which minimizes a sum of the collision potential score, maneuverability score, and traffic violation score of each of the subset of the plurality of possible trajectory nodes 40. In a non-limiting example, the subset of the plurality of possible trajectory nodes 40 is selected to minimize an objective function:

$$c = \sum_{i=0}^{N} \frac{N-i}{N} * (p_i + v_i + m_i) \tag{2}$$

wherein c is the objective function, N is a quantity of nodes in the subset of the plurality of possible trajectory nodes 40, $p_i$ is the collision potential score of an ith node of the subset of the plurality of possible trajectory nodes 40, $v_i$ is the traffic violation score of the ith node of the subset of the plurality of possible trajectory nodes 40, and $m_i$ is the maneuverability score of the ith node of the subset of the plurality of possible trajectory nodes 40.

The objective function includes two constraints. The first constraint is that each of the subset of the plurality of possible trajectory nodes 40 is from a same one of the plurality of possible trajectories 38. This means that the optimal trajectory may only contain nodes from one of the plurality of possible trajectories 38. The second constraint is that a first node of the subset of the plurality of possible trajectory nodes 40 and a second node of the subset of the plurality of possible trajectory nodes 40 must have a collision potential score of less than one. This means that the optimal trajectory may only be one of the plurality of possible trajectories 38 which does not result in a collision with the remote vehicle 32 with the first two nodes of the subset of the plurality of possible trajectory nodes 40.

The factor $$\frac{N-i}{N}$$

discounts the evaluation metrics of nodes of the subset of the plurality of possible trajectory nodes 40 which are farther from the vehicle 12. Therefore, the objective function is biased towards the evaluation metrics of nodes near the vehicle 12, because evaluation metrics of nodes farther from the vehicle 12 may change as the vehicle 12 approaches and more and/or new information is received.

It should be understood that any mathematical optimization technique used to find one of the plurality of possible trajectories 38 which minimizes the objective function (equation 1), including, for example, iterative methods (e.g., Newton's method, gradient descent, and/or the like), heuristic methods (e.g., differential evolution, genetic algorithms, hill climbing algorithms, and/or the like), and/or the like are within the scope of the present disclosure. After block 114, the method 100 proceeds to block 116.

At block 116, the controller 14 performs a first action. In an exemplary embodiment, the first action includes adjusting an operation of the automated driving system 18. In a non-limiting example, the path planning algorithm is adjusted such that the optimal trajectory selected at block 114 is used for further control and navigation of the vehicle 12. It is contemplated that, in some examples, trajectories including traffic violations, for example, trajectories requiring the vehicle 12 to exit a lane boundary, may be optimal when alternative trajectories involve a high risk of collision. Therefore, in some examples, at block 116, the vehicle 12 takes an action including a traffic violation, according to the optimal trajectory selected at block 114.

In another exemplary embodiment, the first action includes the controller 14 using the vehicle communication system 26 transmit the optimal trajectory to external systems, such as, for example, remote vehicles (e.g., the remote vehicle 32), traffic control infrastructure, remote server systems, and/or the like. Remote systems receiving the optimal trajectory from the vehicle 12 may be configured to adjust their operation based on the optimal trajectory of the vehicle 12. For example, remote systems receiving the optimal trajectory from the vehicle 12 may be configured to take actions to reduce collision risk, optimize traffic flow, provide information to road users, and/or the like. After block 116, the method 100 proceeds to enter a standby state at block 118.

In an exemplary embodiment, the controller 14 repeatedly exits the standby state 118 and restarts the method 100 at block 102. In a non-limiting example, the controller 14 exits the standby state 118 and restarts the method 100 on a timer, for example, every three hundred milliseconds.

Figure 4:
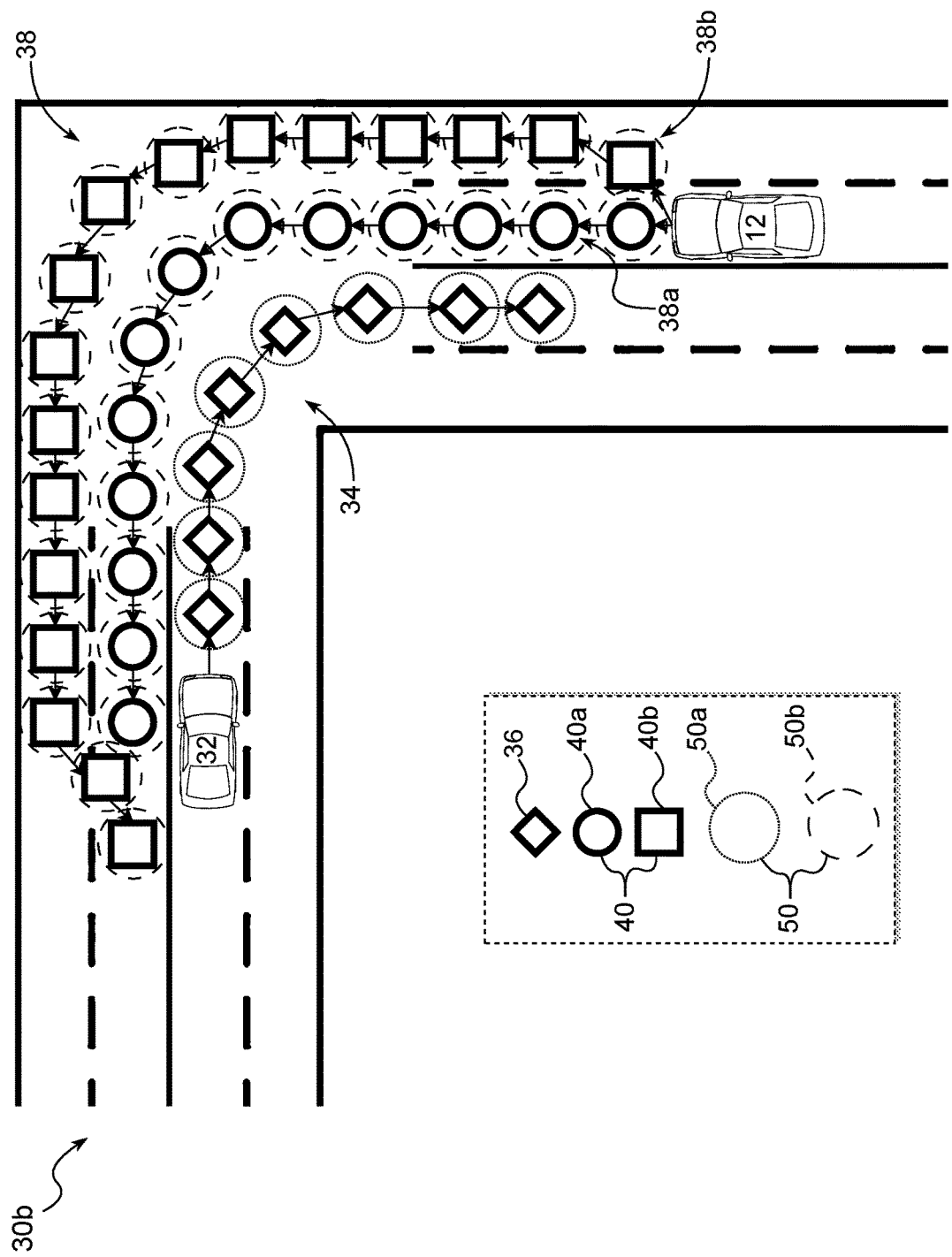
FIG. 4 is a schematic diagram of a second exemplary road scene including uncertainties, according to an exemplary embodiment.

Referring to FIG. 4, a schematic diagram of a second exemplary road scene 30b including uncertainties is shown. The second exemplary road scene 30b includes all of the elements of the first exemplary road scene 30a (i.e., the vehicle 12, the remote vehicle 32, the predicted trajectory 34, and the plurality of possible trajectories 38). However, the second exemplary road scene 30b further includes a plurality of uncertainties 50. In the scope of the present disclosure, each of the plurality of uncertainties 50 is a two-dimensional area around each of the plurality of predicted trajectory nodes 36 and each of the plurality of possible trajectory nodes 40 which defines an uncertainty of the location of each of the plurality of predicted trajectory nodes 36 and each of the plurality of possible trajectory nodes 40. The plurality of uncertainties 50 includes a plurality of predicted trajectory uncertainties 50a and a plurality of possible trajectory uncertainties 50b.

Figure 5:
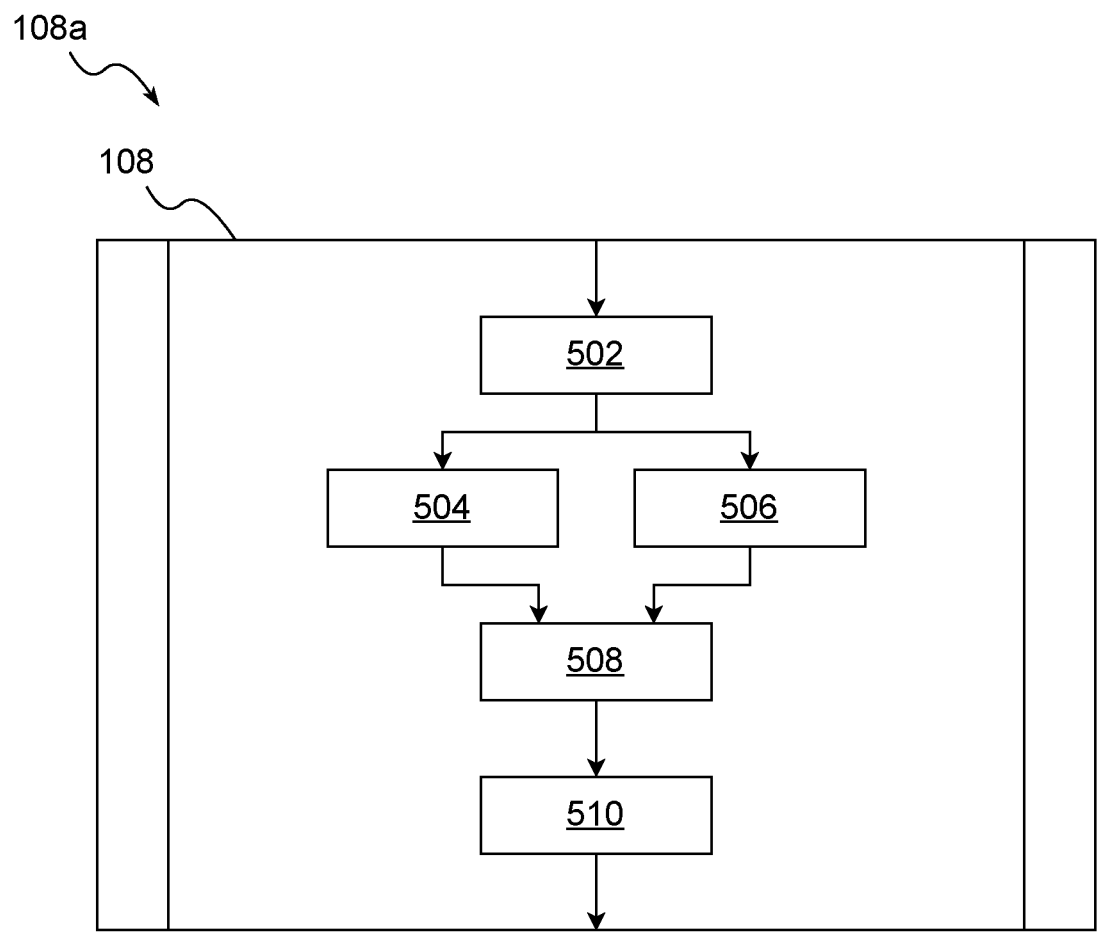
FIG. 5 is a flowchart of a method for determining a collision potential score, according to an exemplary embodiment.

Referring to FIG. 5, a flowchart of an exemplary embodiment 108a of block 108 is shown. The exemplary embodiment 108a begins at block 502. With reference to FIGS. 4 and 5, at block 502, the controller 14 determines the plurality of uncertainties 50. In an exemplary embodiment, each of the plurality of uncertainties 50 is a two-dimensional Gaussian probability distribution. In a non-limiting example, one or more parameters of the two-dimensional Gaussian probability distribution (e.g., a covariance matrix) for each of the plurality of uncertainties 50 is determined based at least in part on weather conditions and/or road surface conditions in the environment surrounding the vehicle 12. In another non-limiting example, the one or more parameters of the two-dimensional Gaussian probability distribution for each of the plurality of uncertainties 50 is determined based on known error of one or more of the plurality of vehicle sensors 16 (e.g., a known localization error of the GNSS 28).

In an exemplary embodiment, the weather conditions are determined using the plurality of vehicle sensors 16. In a non-limiting example, the camera system 24 is used to capture one or more images of the environment surrounding the vehicle 12, and the weather conditions are inferred from the one or more images. In another non-limiting example, the vehicle communication system 26 is used to receive weather information from a remote vehicle (e.g., the remote vehicle 32) and/or a remote server system. For example, in inclement weather and/or poor road surface conditions, positional uncertainty of the vehicle 12 and/or the remote vehicle 32 may be higher due to potential for extended stopping distances, larger turn radii, loss of traction, and/or the like.

It should be understood that additional methods for determining parameters of the plurality of uncertainties 50 may be used without departing from the scope of the present disclosure, including, for example, systems and methods disclosed in U.S. application Ser. No. 18/335,758, titled "END-TO-END PERCEPTION PERTURBATION MODELING SYSTEM FOR A VEHICLE", filed on Jun. 15, 2023, the entire contents of which is hereby incorporated by reference. After block 502, the exemplary embodiment 108a proceeds to blocks 504 and 506.

At block 504, the controller 14 determines a longitudinal bias for each of the plurality of possible trajectory nodes 40 and each of the plurality of predicted trajectory nodes 36. In an exemplary embodiment, the longitudinal bias is determined based at least in part on longitudinal car-following driving behavior modeling. In a non-limiting example, the Gipps car-following model is used to determine longitudinal bias. In another non-limiting example, the longitudinal bias is determined based at least in part on the weather conditions in the environment surrounding the vehicle 12, for example, as disclosed in U.S. application Ser. No. 18/340,249, titled "PROBABILISTIC DRIVING BEHAVIOR MODELING SYSTEM FOR A VEHICLE", filed on Jun. 23, 2023, the entire contents of which is hereby incorporated by reference. After block 504, the exemplary embodiment 108a proceeds to block 508, as will be discussed in greater detail below.

At block 506, the controller 14 determines a lateral bias for each of the plurality of possible trajectory nodes 40 and each of the plurality of predicted trajectory nodes 36. In an exemplary embodiment, the lateral bias is determined based at least in part on a dynamics-based model which accounts for the weather conditions in the environment surrounding the vehicle 12. In a non-limiting example, the dynamics-based model is a mathematical model of a vehicle which can determine lateral movement of the vehicle 12 based on a plurality of parameters. Therefore, the dynamics-based model outputs a lateral bias for each of the plurality of possible trajectory nodes 40 and each of the plurality of predicted trajectory nodes 36 based on the plurality of parameters.

The plurality of parameters includes vehicle parameters, such as, for example, vehicle speed, vehicle acceleration, vehicle steering angle, vehicle braking force, tire tread wear, tire temperature, and/or the like. The plurality of parameters also includes weather and/or road condition parameters, such as, for example, road surface temperature, road surface moisture level, amount of standing water, snow, sleet, or hail on the road surface, rate of precipitation upon the road surface, wind speed, and/or the like. In an exemplary embodiment, the plurality of parameters are received using the plurality of vehicle sensors 16.

In an exemplary embodiment, the dynamics-based model uses Burckhardt's method to determine a lateral acceleration of the vehicle based on weather and/or road surface conditions, as discussed in "An Observer of Tire-Road Forces and Friction for Active Security Vehicle Systems" by Baffet et al. (IEEE/ASME TRANSACTIONS ON MECHATRONICS, VOL. 12, NO. 6, pg. 651-661, December 2007), the entire contents of which is hereby incorporated by reference. After block 506, the exemplary embodiment 108a proceeds to block 508.

Figure 6:
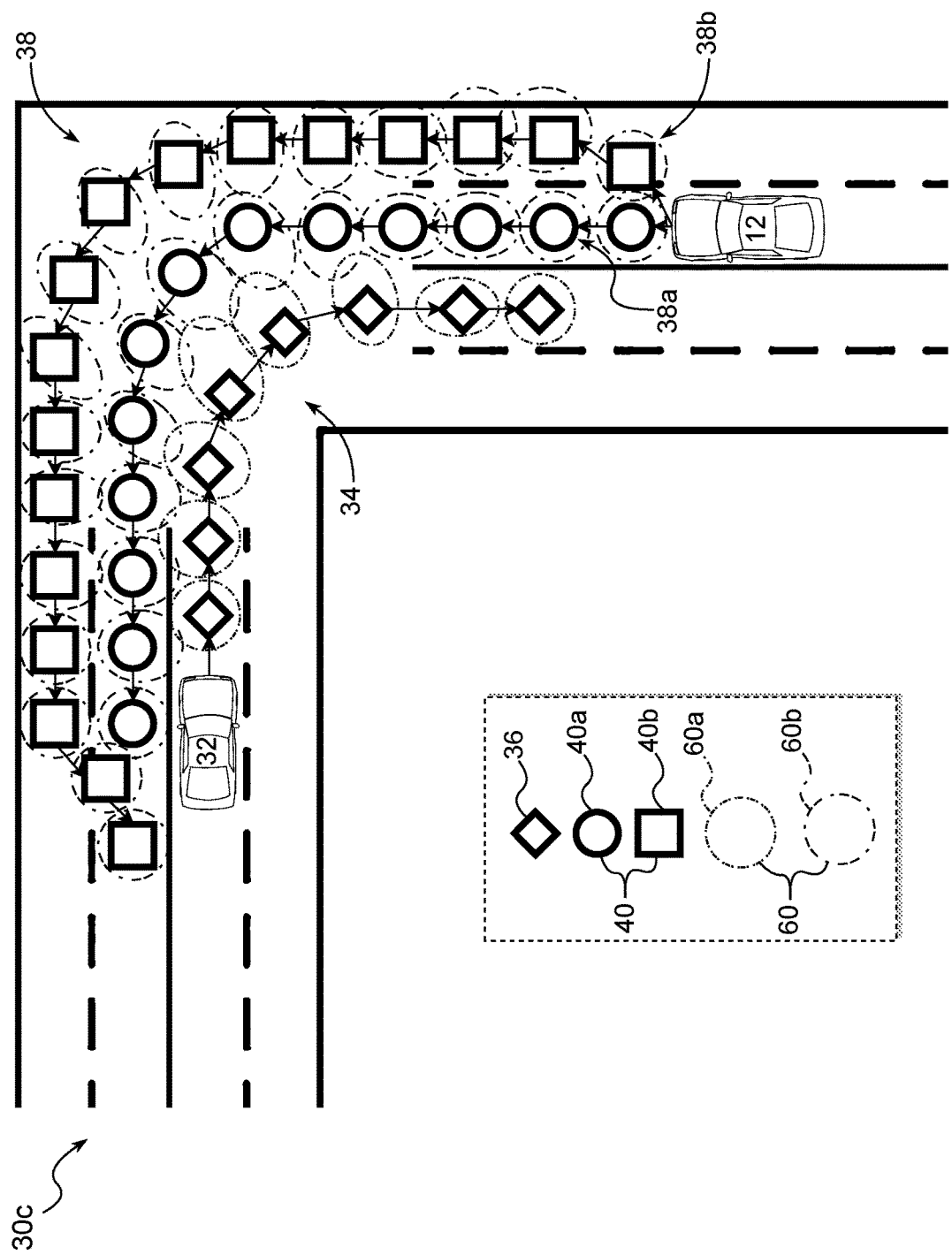
FIG. 6 is a schematic diagram of a third exemplary road scene including biased uncertainties, according to an exemplary embodiment.

Referring to FIG. 6, a schematic diagram of a third exemplary road scene 30c including biased uncertainties is shown. The third exemplary road scene 30c includes all of the elements of the first exemplary road scene 30a (i.e., the vehicle 12, the remote vehicle 32, the predicted trajectory 34, and the plurality of possible trajectories 38). However, the third exemplary road scene 30c further includes a plurality of biased uncertainties 60. In the scope of the present disclosure, each of the plurality of biased uncertainties 60 is a two-dimensional area around each of the plurality of predicted trajectory nodes 36 and each of the plurality of possible trajectory nodes 40 which defines a biased uncertainty of the location of each of the plurality of predicted trajectory nodes 36 and each of the plurality of possible trajectory nodes 40 based on the longitudinal bias determined at block 504 and the lateral bias determined at block 506. The plurality of biased uncertainties 60 includes a plurality of biased predicted trajectory uncertainties 60a and a plurality of biased possible trajectory uncertainties 60b.

With reference to FIGS. 5 and 6, at block 508, the controller 14 generates the plurality of biased predicted trajectory uncertainties 60a by applying the longitudinal bias determined at block 504 and the lateral bias determined at block 506 to each of the plurality of predicted trajectory uncertainties 50a. The controller 14 further generates the plurality of biased possible trajectory uncertainties 60b by applying the longitudinal bias determined at block 504 and the lateral bias determined at block 506 to each of the plurality of possible trajectory uncertainties 50b.

In an exemplary embodiment, the longitudinal bias and lateral bias are applied to each of the plurality of uncertainties 50 using an equation:

$$P_k^+ = \left(I - P_k^- H_k^T \left(H_k P_k^- H_k^T + R_k\right)^{-1} H_k\right) P_k^- \tag{3}$$

wherein $P_k^+$ is one of the plurality of biased uncertainties 60, I is an identity matrix, $P_k^-$ is one of the plurality of uncertainties 50, $H_k$ is a measurement model, and $R_k$ is one of the longitudinal bias determined at block 504 or the lateral bias determined at block 506. Equation 3 is used twice for each of the plurality of uncertainties 50, once to apply the longitudinal bias and once to apply the lateral bias. After block 508, the exemplary embodiment 108a proceeds to block 510.

At block 510, the controller 14 determines the collision potential score for each of the plurality of possible trajectory nodes 40 based at least in part on the plurality of biased predicted trajectory uncertainties 60a and the plurality of predicted trajectory uncertainties 50a. In an exemplary embodiment, the collision potential score for each of the plurality of possible trajectory nodes 40 is defined by:

$$p_i = \frac{r_i \cap e_i}{r_i \cup e_i} \tag{4}$$

wherein $p_i$ is the collision potential score for an ith node of the plurality of possible trajectory nodes 40, $r_i$ is one of the plurality of biased predicted trajectory uncertainties 60a corresponding to an ith node of the plurality of predicted trajectory nodes 36, et is one of the plurality of biased possible trajectory uncertainties 60b corresponding to the ith node of the plurality of possible trajectory nodes 40, ∪ is an intersection operator, and ∩ is a union operator. In other words, the collision potential score is related to an overlap of the plurality of biased predicted trajectory uncertainties 60a with the plurality of biased possible trajectory uncertainties 60b. After block 510, the exemplary embodiment 108a is concluded, and the method 100 proceeds as discussed above.

Figure 7:
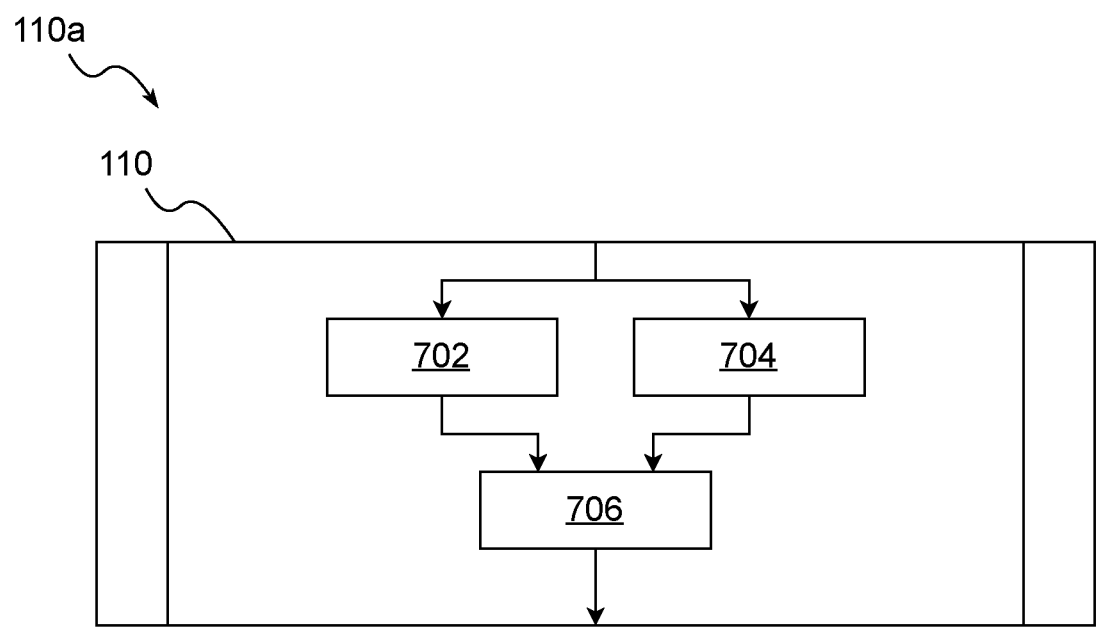
FIG. 7 is a flowchart of a method for determining a maneuverability score, according to an exemplary embodiment.

Referring to FIG. 7, a flowchart of an exemplary embodiment 110a of block 110 is shown. The exemplary embodiment 110a begins at blocks 702 and 704. At block 702, the controller 14 determines a maximum torque available from a propulsion system (e.g., internal combustion engine, hybrid-electric drive, full electric drive, and/or the like) of the vehicle 12. In an exemplary embodiment, the maximum torque available is predetermined and stored in the media 22 of the controller 14. After block 702, the exemplary embodiment 110a proceeds to block 706, as will be discussed in greater detail below.

At block 704, the controller 14 determines an estimated propulsion system torque required to reach each of the plurality of possible trajectory nodes 40. In an exemplary embodiment, the estimated propulsion system torque required to reach a given node is determined based at least in part on a dynamics-based model which accounts for the weather conditions in the environment surrounding the vehicle 12. In a non-limiting example, the dynamics-based model is a mathematical model of a vehicle which can determine the estimated propulsion system torque required to reach a given node based on a plurality of parameters. Therefore, the dynamics-based model outputs the estimated propulsion system torque for each of the plurality of possible trajectory nodes 40. It should be understood that in some examples, one or more of the plurality of possible trajectory nodes 40 may be located in areas which are impossible to reach, regardless of available torque. Therefore, in instances where one or more of the plurality of possible trajectory nodes 40 are, for example, located in a body of water, obstructed by a wall or other obstacle, and/or the like, the maneuverability score is determined to be a very large value (e.g., infinity).

The plurality of parameters includes terrain parameters, such as, for example, road surface type (e.g., paved, dirt, sand, and/or the like), road surface condition (e.g., broken road surface, freshly renewed road surface, and/or the like), roadway elevation change, and/or the like. The plurality of parameters also includes weather parameters, such as, for example, road surface temperature, road surface moisture level, amount of standing water, snow, sleet, or hail on the road surface, rate of precipitation upon the road surface, wind speed, and/or the like. In an exemplary embodiment, the plurality of parameters are received using the plurality of vehicle sensors 16. After block 704, the exemplary embodiment 110a proceeds to block 706.

At block 706, the controller 14 determines the maneuverability score for each of the plurality of possible trajectory nodes 40 using a formula:

$$m_i = \frac{T_i}{T_{MAX}} \tag{5}$$

wherein $m_i$ is the maneuverability score for an ith node of the plurality of possible trajectory nodes 40, $T_i$ is the estimated propulsion system torque required to reach the ith node of the plurality of possible trajectory nodes 40 determined at block 704, and $T_{MAX}$ is the maximum torque available from the propulsion system of the vehicle as determined at block 702. After block 706, the exemplary embodiment 110*a* is concluded, and the method 100 proceeds as discussed above.

The system 10 and method 100 of the present disclosure offer several advantages. By considering weather and/or road surface conditions to determine the optimal trajectory, the system 10 and method 100 of the present disclosure provide for increased performance of the automated driving system 18, thus increasing awareness and convenience of occupants of the vehicle 12. Additionally, it is contemplated that, in some examples, trajectories including unconventional maneuvers, for example, traffic violations, may be optimal when alternative trajectories involve a high risk of collision. Therefore, the system 10 and method 100 of the present disclosure allow consideration of evasive or otherwise unconventional maneuvers which may be necessary to avoid a collision in situations involving inclement weather.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for path planning for a vehicle, the method comprising:
    determining a predicted trajectory of a remote vehicle, wherein the predicted trajectory of the remote vehicle includes a plurality of predicted trajectory nodes;
    determining a plurality of possible trajectories for the vehicle, wherein the plurality of possible trajectories includes a plurality of possible trajectory nodes;
    performing a closeness check of the plurality of possible trajectories, wherein the closeness check includes removing a first trajectory from the plurality of possible trajectories in response to determining that the first trajectory includes one or more of the plurality of possible trajectory nodes which are within a predetermined minimum stopping distance of one or more of the plurality of predicted trajectory nodes;
    determining one or more evaluation metrics of each of the plurality of possible trajectory nodes based at least in part on a weather condition in an environment surrounding the vehicle, wherein the one or more evaluation metrics includes a collision potential score, a maneuverability score, and a traffic violation score;
    selecting an optimal trajectory for the vehicle from the plurality of possible trajectories based at least in part on the one or more evaluation metrics of each of the plurality of possible trajectory nodes; and
    performing a first action based at least in part on the optimal trajectory.

2. The method of claim 1, wherein determining the collision potential score for each of the plurality of possible trajectory nodes further comprises:
    determining a plurality of uncertainties, wherein the plurality of uncertainties includes a plurality of predicted trajectory uncertainties and a plurality of possible trajectory uncertainties, wherein each of the plurality of predicted trajectory uncertainties corresponds to one of the plurality of predicted trajectory nodes, and wherein each of the plurality of possible trajectory uncertainties corresponds to one of the plurality of possible trajectory nodes;
    determining a plurality of biased predicted trajectory uncertainties and a plurality of biased possible trajectory uncertainties by applying a bias to each of the plurality of predicted trajectory uncertainties and each of the plurality of possible trajectory uncertainties, wherein the bias is based at least in part on the weather condition in the environment surrounding the vehicle; and
    determining the collision potential score for each of the plurality of possible trajectory nodes based at least in part on the plurality of biased predicted trajectory uncertainties and the plurality of biased possible trajectory uncertainties.

3. The method of claim 2, wherein determining the plurality of uncertainties further comprises:
    determining the plurality of uncertainties based on at least one of: the weather condition in the environment surrounding the vehicle and a localization error of one or more of a plurality of vehicle sensors.

4. The method of claim 2, wherein determining the plurality of biased predicted trajectory uncertainties and the plurality of biased possible trajectory uncertainties further comprises:
    determining a longitudinal bias for each of the plurality of possible trajectory nodes and each of the plurality of predicted trajectory nodes;
    determining a lateral bias for each of the plurality of possible trajectory nodes and each of the plurality of predicted trajectory nodes, wherein the lateral bias is determined based at least in part on a dynamics-based model and the weather condition in the environment surrounding the vehicle;
    applying the longitudinal bias and the lateral bias to each of the plurality of predicted trajectory uncertainties; and
    applying the longitudinal bias and the lateral bias to each of the plurality of possible trajectory uncertainties.

5. The method of claim 2, wherein determining the collision potential score for each of the plurality of possible trajectory nodes further comprises:
    determining the collision potential score using a formula:

$$p_i = \frac{r_i \cap e_i}{r_i \cup e_i}$$

wherein $p_i$ is the collision potential score for an ith node of the plurality of possible trajectory nodes, $r_i$ is one of the plurality of biased predicted trajectory uncertainties corresponding to an ith node of the plurality of predicted trajectory nodes, et is one of the plurality of biased possible trajectory uncertainties corresponding to the ith node of the plurality of possible trajectory nodes, $\cap$ is an intersection operator, and $\cup$ is a union operator.

6. The method of claim 2, wherein determining the maneuverability score for each of the plurality of possible trajectory nodes further comprises:
    determining an estimated propulsion system torque required to reach each of the plurality of possible trajectory nodes; and
    determining the maneuverability score for each of the plurality of possible trajectory nodes based at least in part on the estimated propulsion system torque using a formula:

$$m_i = \frac{T_i}{T_{MAX}}$$

wherein $m_i$ is the maneuverability score for an ith node of the plurality of possible trajectory nodes, $T_i$ is the estimated propulsion system torque required to reach the ith node of the plurality of possible trajectory nodes, and $T_{MAX}$ is a maximum torque available from a propulsion system of the vehicle.

7. The method of claim 6, wherein the traffic violation score quantifies a legality of maneuvering the vehicle to each of the plurality of possible trajectory nodes.

8. The method of claim 7, wherein selecting the optimal trajectory further comprises:
selecting a subset of the plurality of possible trajectory nodes to be the optimal trajectory, wherein the subset of the plurality of possible trajectory nodes is selected to minimize a sum of each of the one or more evaluation metrics of each of the subset of the plurality of possible trajectory nodes.

9. The method of claim 7, wherein selecting the optimal trajectory further comprises:
selecting a subset of the plurality of possible trajectory nodes to be the optimal trajectory, wherein the subset of the plurality of possible trajectory nodes is selected to minimize an objective function:

$$c = \sum_{i=0}^{N} \frac{N-i}{N} * (p_i + v_i + m_i)$$

wherein c is the objective function, N is a quantity of nodes in the subset of the plurality of possible trajectory nodes, $p_i$ is the collision potential score of an ith node of the subset of the plurality of possible trajectory nodes, $v_i$ is the traffic violation score of the ith node of the subset of the plurality of possible trajectory nodes, and $m_i$ is the maneuverability score of the ith node of the subset of the plurality of possible trajectory nodes, wherein each of the subset of the plurality of possible trajectory nodes is from a same one of the plurality of possible trajectories, and wherein the collision potential score of a first node of the subset of the plurality of possible trajectory nodes and a second node of the subset of the plurality of possible trajectory nodes is less than one.

10. The method of claim 1, wherein performing the first action further comprises:
adjusting an operation of an automated driving system of the vehicle based at least in part on the optimal trajectory.

11. A system for path planning for a vehicle, the system comprising:
a plurality of vehicle sensors;
an automated driving system; and
a controller in electrical communication with the plurality of vehicle sensors and the automated driving system, wherein the controller is programmed to:
determine a predicted trajectory of a remote vehicle using the plurality of vehicle sensors, wherein the predicted trajectory of the remote vehicle includes a plurality of predicted trajectory nodes;
determine a plurality of possible trajectories for the vehicle using the plurality of vehicle sensors, wherein the plurality of possible trajectories includes a plurality of possible trajectory nodes;
perform a closeness check of the plurality of possible trajectories, wherein the closeness check includes removing a first trajectory from the plurality of possible trajectories in response to determining that the first trajectory includes one or more of the plurality of possible trajectory nodes which are within a predetermined minimum stopping distance of one or more of the plurality of predicted trajectory nodes;
determine one or more evaluation metrics of each of the plurality of possible trajectory nodes based at least in part on a weather condition in an environment surrounding the vehicle, wherein the weather condition is determined using the plurality of vehicle sensors, and wherein the one or more evaluation metrics includes a collision potential score, a maneuverability score, and a traffic violation score;
select an optimal trajectory for the vehicle from the plurality of possible trajectories based at least in part on the one or more evaluation metrics of each of the plurality of possible trajectory nodes; and
adjust an operation of the automated driving system based at least in part on the optimal trajectory.

12. The system of claim 11, wherein to determine the collision potential score for each of the plurality of possible trajectory nodes, the controller is further programmed to:
determine a plurality of uncertainties, wherein the plurality of uncertainties includes a plurality of predicted trajectory uncertainties and a plurality of possible trajectory uncertainties, wherein each of the plurality of predicted trajectory uncertainties corresponds to one of the plurality of predicted trajectory nodes, and wherein each of the plurality of possible trajectory uncertainties corresponds to one of the plurality of possible trajectory nodes;
determine a plurality of biased predicted trajectory uncertainties and a plurality of biased possible trajectory uncertainties by applying a bias to each of the plurality of predicted trajectory uncertainties and each of the plurality of possible trajectory uncertainties, wherein the bias is based at least in part on the weather condition in the environment surrounding the vehicle; and
determine the collision potential score for each of the plurality of possible trajectory nodes based at least in part on the plurality of biased predicted trajectory uncertainties and the plurality of biased possible trajectory uncertainties.

13. The system of claim 12, wherein to determine the plurality of biased predicted trajectory uncertainties and the plurality of biased possible trajectory uncertainties, the controller is further programmed to:
determine a longitudinal bias for each of the plurality of possible trajectory nodes and each of the plurality of predicted trajectory nodes;
determine a lateral bias for each of the plurality of possible trajectory nodes and each of the plurality of predicted trajectory nodes, wherein the lateral bias is determined based at least in part on a dynamics-based model and the weather condition in the environment surrounding the vehicle;
apply the longitudinal bias and the lateral bias to each of the plurality of predicted trajectory uncertainties; and
apply the longitudinal bias and the lateral bias to each of the plurality of possible trajectory uncertainties.

14. The system of claim 12, wherein to determine the collision potential score for each of the plurality of possible trajectory nodes, the controller is further programmed to:
determine the collision potential score using a formula:

$$p_i = \frac{r_i \cap e_i}{r_i \cup e_i}$$

wherein $p_i$ is the collision potential score for an ith node of the plurality of possible trajectory nodes, $r_i$ is one of the plurality of biased predicted trajectory uncertainties corresponding to an ith node of the plurality of predicted trajectory nodes, $e_i$ is one of the plurality of biased possible trajectory uncertainties corresponding to the ith node of the plurality of possible trajectory nodes, $\cap$ is an intersection operator, and $\cup$ is a union operator.

15. The system of claim 12, wherein to determine the maneuverability score for each of the plurality of possible trajectory nodes, the controller is further programmed to:
   determine an estimated propulsion system torque required to reach each of the plurality of possible trajectory nodes; and
   determine the maneuverability score for each of the plurality of possible trajectory nodes based at least in part on the estimated propulsion system torque using a formula:

$$m_i = \frac{T_i}{T_{MAX}}$$

wherein $m_i$ is the maneuverability score for an ith node of the plurality of possible trajectory nodes, $T_i$ is the estimated propulsion system torque required to reach the ith node of the plurality of possible trajectory nodes, and $T_{MAX}$ is a maximum torque available from a propulsion system of the vehicle.

16. The system of claim 15, wherein the traffic violation score quantifies a legality of maneuvering the vehicle to each of the plurality of possible trajectory nodes.

17. The system of claim 16, wherein to select the optimal trajectory, the controller is further programmed to:
   select a subset of the plurality of possible trajectory nodes to be the optimal trajectory, wherein the subset of the plurality of possible trajectory nodes is selected to minimize an objective function:

$$c = \sum_{i=0}^{N} \frac{N-i}{N} * (p_i + v_i + m_i)$$

wherein c is the objective function, N is a quantity of nodes in the subset of the plurality of possible trajectory nodes, $p_i$ is the collision potential score of an ith node of the subset of the plurality of possible trajectory nodes, $v_i$ is the traffic violation score of the ith node of the subset of the plurality of possible trajectory nodes, and $m_i$ is the maneuverability score of the ith node of the subset of the plurality of possible trajectory nodes, wherein each of the subset of the plurality of possible trajectory nodes is from a same one of the plurality of possible trajectories, and wherein the collision potential score of a first node of the subset of the plurality of possible trajectory nodes and a second node of the subset of the plurality of possible trajectory nodes is of less than one.

18. A system for path planning for a vehicle, the system comprising:
   a plurality of vehicle sensors;
   an automated driving system; and
   a controller in electrical communication with the plurality of vehicle sensors and the automated driving system, wherein the controller is programmed to:
      determine a predicted trajectory of a remote vehicle using the plurality of vehicle sensors, wherein the predicted trajectory of the remote vehicle includes a plurality of predicted trajectory nodes;
      determine a plurality of possible trajectories for the vehicle using the plurality of vehicle sensors, wherein the plurality of possible trajectories includes a plurality of possible trajectory nodes;
      perform a closeness check of the plurality of possible trajectories, wherein the closeness check includes removing a first trajectory from the plurality of possible trajectories in response to determining that the first trajectory includes one or more of the plurality of possible trajectory nodes which are within a predetermined minimum stopping distance of one or more of the plurality of predicted trajectory nodes;
      determine one or more evaluation metrics of each of the plurality of possible trajectory nodes based at least in part on a weather condition in an environment surrounding the vehicle, wherein the one or more evaluation metrics includes a collision potential score, a maneuverability score, and a traffic violation score;
      select an optimal trajectory for the vehicle from the plurality of possible trajectories based at least in part on the one or more evaluation metrics of each of the plurality of possible trajectory nodes; and
      adjust an operation of the automated driving system, wherein the operation of the automated driving system is adjusted such that the vehicle exits a lane boundary based at least in part on the optimal trajectory.

19. The system of claim 18, wherein to determine the collision potential score for each of the plurality of possible trajectory nodes, the controller is further programmed to:
   determine a plurality of uncertainties, wherein the plurality of uncertainties includes a plurality of predicted trajectory uncertainties and a plurality of possible trajectory uncertainties, wherein each of the plurality of predicted trajectory uncertainties corresponds to one of the plurality of predicted trajectory nodes, and wherein each of the plurality of possible trajectory uncertainties corresponds to one of the plurality of possible trajectory nodes;
   determine a plurality of biased predicted trajectory uncertainties and a plurality of biased possible trajectory uncertainties by applying a bias to each of the plurality of predicted trajectory uncertainties and each of the plurality of possible trajectory uncertainties, wherein the bias is based at least in part on the weather condition in the environment surrounding the vehicle; and
   determine the collision potential score for each of the plurality of possible trajectory nodes based at least in part on the plurality of biased predicted trajectory uncertainties and a plurality of biased possible trajectory uncertainties.

20. The system of claim 19, wherein to select the optimal trajectory, the controller is further programmed to:
   select a subset of the plurality of possible trajectory nodes to be the optimal trajectory, wherein the subset of the plurality of possible trajectory nodes is selected to minimize an objective function:

$$c = \sum_{i=0}^{N} \frac{N-i}{N} * (p_i + v_i + m_i)$$

wherein c is the objective function, N is a quantity of nodes in the subset of the plurality of possible trajectory nodes, $p_i$ is the collision potential score of an ith node of the subset of the plurality of possible trajectory nodes, $v_i$ is the traffic violation score of the ith node of the subset of the plurality of possible trajectory nodes, and $m_i$ is the maneuverability score of the ith node of the subset of the plurality of possible trajectory nodes, wherein each of the subset of the plurality of possible trajectory nodes is from a same one of the plurality of possible trajectories, and wherein a first node of the subset of the plurality of possible trajectory nodes and a second node of the subset of the plurality of possible trajectory nodes have a collision potential score of less than one.

* * * * *